DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 275

T904,026

SENSITIZING DYE COMBINATIONS CONTAINING BENZIMIDAZOLOBENZOXAZOLOCARBOCYANINE DYES

Mary Jane W. Brizee, Pittsford, N.Y.
(Kodak Park, Rochester, N.Y. 14650)

Filed Jan. 24, 1972, Ser. No. 220,417
**Int. Cl. G03c *1/18***
U.S. Cl. 96—124
No Drawing. 37 Pages Specification

Photographic silver halide emulsions are spectrally sensitized with a dye combination comprising (1) a benzimidazolobenzoxazolcarbocyanine dye, and (2) a sensitizing dye selected from the group consisting of (a) a hemicyanine dye, (b) a merocyanine dye, (c) a complex cyanine dye containing a 5-membered ketomethylene heterocyclic nucleus containing nitrogen as the first heteroatom and nitrogen or sulfur as the second heteroatom, (d) a dicarbocyanine dye, (e) a tricarbocyanine dye, (f) a hemioxonol dye, and (g) a complex merocyanine dye. In preferred dye combinations the benzimidazolobenzoxazolocarbocyanine dye has the following formula:

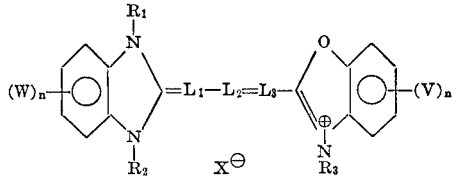

wherein each $n$ represents 1 or 2; $R_1$ represents an unsubstituted lower alkyl group; $R_2$ and $R_3$ each represents an alkyl group, an alkenyl group or an aryl group; X represents an acid anion; W represents halogen, an alkylcarbamoyl group, an acyl group, an aryl group, an alkyl group, an alkoxy group, cyano, a haloalkyl group or a haloalkylsulfonyl group; and V represents an alkoxy group, an alkyl group or an aryl group, $L_1$, $L_2$, and $L_3$ represent a methine linkage. Typical highly useful emulsions comprise silver bromoiodide emulsions containing a combination of a benzimidazolobenzoxazolocarbocyanine dye such as anhydro-1-allyl-5-chloro-3′-ethyl-5′-methoxy-3-(3 - sulfopropyl)-benzimidazoloxacarbocyanine hydroxide or anhydro-5,6-dichloro-1,3′-diethyl-5′-methoxy - 3 - (3-sulfopropyl)benzimidazoloxacarbocyanine hydroxide, and one of the dyes (a) through (g) above.